United States Patent
Matsumoto et al.

(10) Patent No.: US 7,998,636 B2
(45) Date of Patent: Aug. 16, 2011

(54) POLYMER ELECTROLYTE FUEL CELL STACK

(75) Inventors: Toshihiro Matsumoto, Osaka (JP); Yoko Yamamoto, Osaka (JP); Takashi Morimoto, Osaka (JP); Mitsuo Yoshimura, Kyoto (JP); Kenji Arai, Osaka (JP); Yoshiki Nagao, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/919,025

(22) PCT Filed: Mar. 26, 2010

(86) PCT No.: PCT/JP2010/002211
§ 371 (c)(1), (2), (4) Date: Aug. 24, 2010

(87) PCT Pub. No.: WO2010/109917
PCT Pub. Date: Sep. 30, 2010

(65) Prior Publication Data
US 2011/0059380 A1 Mar. 10, 2011

(30) Foreign Application Priority Data
Mar. 27, 2009 (JP) .................................. 2009-080362

(51) Int. Cl.
 *H01M 8/02* (2006.01)
 *H01M 8/24* (2006.01)
(52) U.S. Cl. ...................... 429/458; 429/437; 429/508
(58) Field of Classification Search ........................ None
See application file for complete search history.

(56) References Cited

U.S. PATENT DOCUMENTS

| 7,541,108 B2 | 6/2009 | Kawabata et al. |
| 2006/0134470 A1 | 6/2006 | Kaye et al. |
| 2009/0017355 A1 | 1/2009 | Kawabata et al. |
| 2009/0162717 A1 | 6/2009 | Nakagawa et al. |

FOREIGN PATENT DOCUMENTS

| JP | 7-282836 | 10/1995 |
| JP | 9-63623 | 3/1997 |
| JP | 10-32016 | 2/1998 |
| JP | 2005-203228 | 7/2005 |
| JP | 2005-285650 | 10/2005 |
| JP | 2007-294330 | 11/2007 |
| JP | 2008-4490 | 1/2008 |
| JP | 2008-293996 | 12/2008 |

OTHER PUBLICATIONS

Japan Office action, dated Oct. 12, 2010 along with an english translation thereof.

*Primary Examiner* — Jonathan Crepeau
(74) *Attorney, Agent, or Firm* — Greenblum & Bernstein P.L.C.

(57) ABSTRACT

A fuel cell stack comprising: a cell stack body having stacked single cells and a manifold for supplying or discharging a fluid to the stacked single cells, the single cell including a membrane electrode assembly and a separator sandwiching the membrane electrode assembly; an end plate stacked onto the cell stack body and having a through-hole along the stacking direction of the cell stack body; and a fluid tube body inserted detachably into the through-hole so as to pass through the end plate, the fluid tube body being connected to the manifold, wherein a part of the outer surface of the fluid tube body opposite to the inner surface of the through-hole is separated from the inner surface of the through-hole.

3 Claims, 7 Drawing Sheets

POLYMER ELECTROLYTE FUEL CELL STACK

TECHNICAL FIELD

The present invention relates to a polymer electrolyte fuel cell stack.

BACKGROUND ART

A fuel cell stack has a structure in which fuel cell (single cell) are stacked. A single cell includes a membrane electrode assembly (hereinafter, referred to as "MEA") having a polymer electrolyte membrane and a pair of catalyst electrodes sandwiching the polymer electrolyte membrane; and a pair of separators sandwiching the membrane electrode assembly.

The polymer electrolyte membrane is composed of an electrolyte having an ion exchange membrane of a fluorine resin type having a sulfonic acid group, or a polymer ion exchange membrane such as an ion exchange membrane of a hydrocarbon resin.

The catalyst electrode includes a catalyst layer which contacts with the polymer electrolyte membrane for promoting an oxidation-reduction reaction in the catalyst electrode, and a gas diffusion layer located at the outside of the catalyst layer and that has permeability and conductivity. The gas diffusion layer includes a carbon coat layer for enhancing contact property to the catalyst layer, which contacts with the catalyst layer, and a gas diffusion base layer for diffusing an externally supplied gas so as to allow the gas to be supplied to the catalyst layer. The catalyst layer of a fuel electrode layer contains platinum or an alloy of platinum and ruthenium, for example, and the catalyst layer of an air electrode contains platinum or an alloy of platinum and cobalt, for example.

The separator is a conductive member for preventing a fuel gas supplied to the fuel electrode and an oxide gas supplied to the air electrode from being mixed with each other.

Since the fuel cell stack has the single cells stacked, it can electrically be connected in serial. The fuel cell stack also has a pair of end plates that sandwiches the cell stack body (e.g., refer to Patent Document 1). The end plate has a fluid tube body for supplying a gas or a cooling medium to the fuel cell stack or for discharging the gas or the cooling medium from the fuel cell stack.

Figure 1:
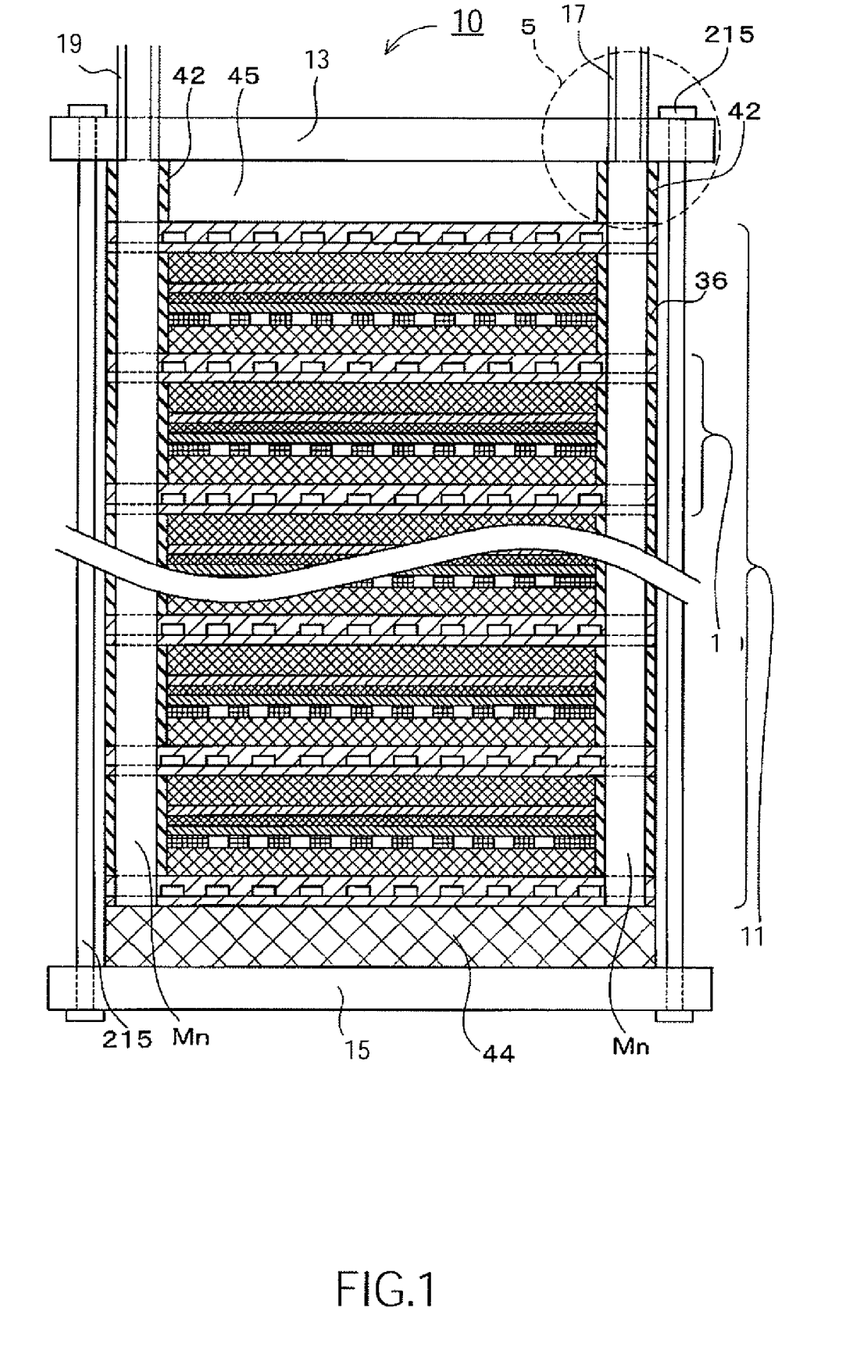
FIG. 1 is a sectional view of a conventional fuel cell stack.

FIG. 1 is a sectional view illustrating fuel cell stack 10 disclosed in Patent Document 1. As illustrated in FIG. 1, the fuel cell stack 10 disclosed in Patent Document 1 has cell stack body 11, and end plates 15 and 17 that hold the cell stack body 11. The end plate 13 has fluid tube bodies 17 and 19.

In fuel cell stack 10 disclosed in Patent Document 1, end plate 13 and fluid tube bodies 17 and 19 are in contact with each other without having a gap therebetween as illustrated in FIG. 1. There has also been known a technique in which the fluid tube body is made of a material having a low thermal conductivity in order to prevent a heat of a fluid flowing through the fluid tube body from transferring to the end plate (e.g., see Patent Document 2).

When a fuel gas (containing hydrogen) and an oxide gas (containing oxygen) are supplied to the respective single cells in the fuel cell stack having the above-mentioned configuration, electric energy can continuously be taken out. A chemical reaction generated due to the supply of the fuel gas and the oxide gas to the single cell will be described below.

A hydrogen molecule supplied to the fuel electrode is divided into a hydrogen ion and an electron by the catalyst layer of the fuel electrode. The hydrogen ion moves toward the air electrode through the humidified polymer electrolyte membrane. On the other hand, the electron moves toward the air electrode to which the oxide gas is supplied through an external circuit. In this case, the electron passing through the external circuit can be used as electric energy. At the catalyst layer of the air electrode, the hydrogen ion moving through the polymer electrolyte membrane, the electron moving through the external circuit, and the oxygen supplied to the air electrode react with one another to produce water. The above-mentioned chemical reaction also produces heat.

When the fuel gas and the oxide gas are supplied to the fuel cell as described above, the electric energy and thermal energy can simultaneously be obtained. Therefore, the fuel cell stack is utilized as a home cogeneration system for power generation and hot-water supply (e.g., see Patent Document 3). In the home cogeneration system, the heat generated during the power generation is successively collected by using a cooling medium discharged from the fluid tube body. The collected heat is stored in a hot-water tank, and utilized as necessary likewise the electric energy.

There has been known a fuel cell system having the fuel cell stack sandwiched between the end plates, a fuel processing apparatus that produces a fuel gas supplied to the fuel cell stack, and an interconnect section that connects the end plates and the fuel processing apparatus (e.g., see Patent Document 4). In the fuel cell system disclosed in Patent Document 4, a gap is partially formed between the interconnect section and the end plates in order to minimize the transfer of heat between the fuel processing apparatus and the fuel cell stack.

Patent Document 1: Japanese Patent Application Laid-Open No. 2007-294330
Patent Document 2: Japanese Patent Application Laid-Open No. H09-063623
Patent Document 3: Japanese Patent Application Laid-Open No. 2008-293996
Patent Document 4: U.S. Patent Application Publication No. 2006/0134470

DISCLOSURE OF INVENTION

Problems to be Solved by the Invention

However, in the conventional fuel cell stack, the heat generated during the power generation is not only collected by the cooling medium but also transfers to the end plates. Since the heat transferring to the end plate is discharged to the outside from the end plate, this heat cannot be collected as the thermal energy, which entails a problem that the heat generated during the power generation cannot efficiently be collected.

When the end plate and the fluid tube body are in intimate contact with each other as in the fuel cell stack illustrated in FIG. 1, in particular, the thermal energy easily transfers to the end plate from the fluid tube body. Even when the fluid tube body is made of a material having low thermal conductivity as disclosed in Patent Document 2, the thermal energy transfers to the end plate from the fluid tube body, so long as the end plate and the fluid tube body are in intimate contact with each other.

An object of the present invention is to provide a fuel cell stack that can reduce a quantity of heat transferring to the end plate from the fluid tube body to be discharged to the outside, so as to be capable of efficiently collecting the heat generated during the power generation.

Means for Solving the Problem

The present inventor has found that the discharge of heat can be reduced by partially separating the fluid tube body and the end plate from each other to form a gap therebetween, and has made a further consideration to complete the present invention. Specifically, the present invention relates to a fuel cell stack described below.

[1] A fuel cell stack comprising: a cell stack body having stacked single cells and a manifold for supplying or discharging a fluid to the stacked single cells, the single cell including a membrane electrode assembly and a separator sandwiching the membrane electrode assembly; an end plate stacked onto the cell stack body and having a through-hole along the stacking direction of the cell stack body; and a fluid tube body inserted detachably into the through-hole so as to pass through the end plate, the fluid tube body being connected to the manifold, wherein a part of the outer surface of the fluid tube body opposite to the inner surface of the through-hole is separated from the inner surface of the through-hole.

[2] A fuel cell stack according to [1], wherein the part of the outer surface of the fluid tube body opposite to the inner surface of the through-hole has a concave/convex shape.

[3] A fuel cell stack according to [2], wherein the convex portion includes a rib, the rib extends along the direction of a flow of the fluid passing through the fluid tube body.

[4] A fuel cell stack according to any one of [1] to [3], wherein the fluid tube body is connected to the manifold for discharging a cooling medium.

ADVANTAGEOUS EFFECTS OF INVENTION

According to the present invention, a gap is formed between the fluid tube body and the end plate, whereby air in the gap functions as a heat-insulating member. Therefore, the quantity of heat transferring from the fluid passing through the fluid tube body to the end plate is small, whereby the quantity of heat discharged to the outside through the end plate is small. Therefore, according to the fuel cell stack of the present invention the heat generated during the power generation can be efficiently collected.

BEST MODE FOR CARRYING OUT THE INVENTION

A fuel cell stack according to the present invention comprises 1) a cell stack body, 2) end plates stacked onto the cell stack body, and 3) a fluid tube body that is detachably mounted to the end plate. The fuel cell stack may have a current-collecting plate between the cell stack body and the end plate. The respective components will be described below.

1. Cell Stack Body

A cell stack body is a stack body of single cells, each having a membrane electrode assembly (hereinafter referred to as "MEA"), and a pair of separators sandwiching the membrane electrode assembly. The cell stack body has a manifold extending therethrough in the stacking direction of the cells. The manifold is a flow path for supplying and discharging a fuel gas, an oxide gas, or a cooling medium to and from the respective single cells.

The MEA has a polymer electrolyte membrane, and a pair of catalyst electrodes including a fuel electrode and an air electrode that hold the polymer electrolyte membrane. The catalyst electrode preferably has a catalyst layer that is in contact with the polymer electrolyte membrane, and a gas diffusion layer stacked onto the catalyst layer.

The polymer electrolyte membrane is a polymer membrane having a function of selectively transporting a proton in a wet condition. The material of the polymer electrolyte membrane is not particularly limited, so long as it can selectively move a hydrogen ion. Examples of the material include a fluorine polymer electrolyte membrane, and a hydrocarbon polymer electrolyte membrane. Examples of the fluorine polymer electrolyte membrane include Nafion (registered trademark) by DuPont, Flemion (registered trademark) by Asahi Glass Co., Ltd., Aciplex (registered trademark) by Asahi Kasei Corporation, and GORE-SELECT (registered trademark) by Japan Gore-Tex Incorporation.

The catalyst layer is a layer containing a catalyst that promotes an oxidation-reduction reaction of hydrogen or oxygen. The catalyst layer is not particularly limited, so long as it has conductivity and has a catalyst function of promoting the oxidation-reduction reaction of hydrogen and oxygen. The catalyst layer at the air electrode contains platinum, an alloy of platinum and cobalt, and an alloy of platinum, cobalt, and nickel, as a catalyst, for example. The catalyst layer at the fuel electrode contains platinum, and an alloy of platinum and ruthenium as a catalyst, for example.

The catalyst layer is formed by mixing a carbon fine particle, such as acetylene black, Ketjen black, or Vulcan, which carries these catalysts, an electrolyte having proton conductivity, and a resin such as PTFE having water repellency, and applying the resultant onto the polymer electrolyte membrane, for example.

The gas diffusion layer is a porous layer having conductivity. The material of the gas diffusion layer is not particularly limited, so long as it has conductivity, and can diffuse a reaction gas. The gas diffusion layer may be composed of a gas diffusion base layer for diffusing a gas supplied from the separator to the catalyst layer, and a carbon coat layer for enhancing a contact property between the gas diffusion base layer and the catalyst layer.

The separator is a conductive member having a fuel gas flow path on the surface that is in contact with the fuel electrode, and an oxide gas flow path on the surface that is in contact with the air electrode. The surfaces of the separator having the gas flow paths have a concave portion and a convex portion, wherein the concave portion forms the gas flow path.

The separator has a cooling medium inlet manifold hole for supplying the cooling medium, and a cooling medium outlet manifold hole for discharging the cooling medium. The separator also has a manifold hole for supplying and discharging the fuel gas, and a manifold hole for supplying and discharging the oxide gas. The separator may also have a rubber seal portion for preventing the cooling medium, the oxide gas, and the fuel gas from being leaked.

2. End Plate

The end plate is a member constituting the end portions of the fuel cell stack in the stacking direction. The fuel cell stack generally has a pair of end plates, and the pair of the end plates sandwiches the cell stack body. The end plate preferably has high rigidity in order to support a load applied to the cell stack body.

Figure 3:
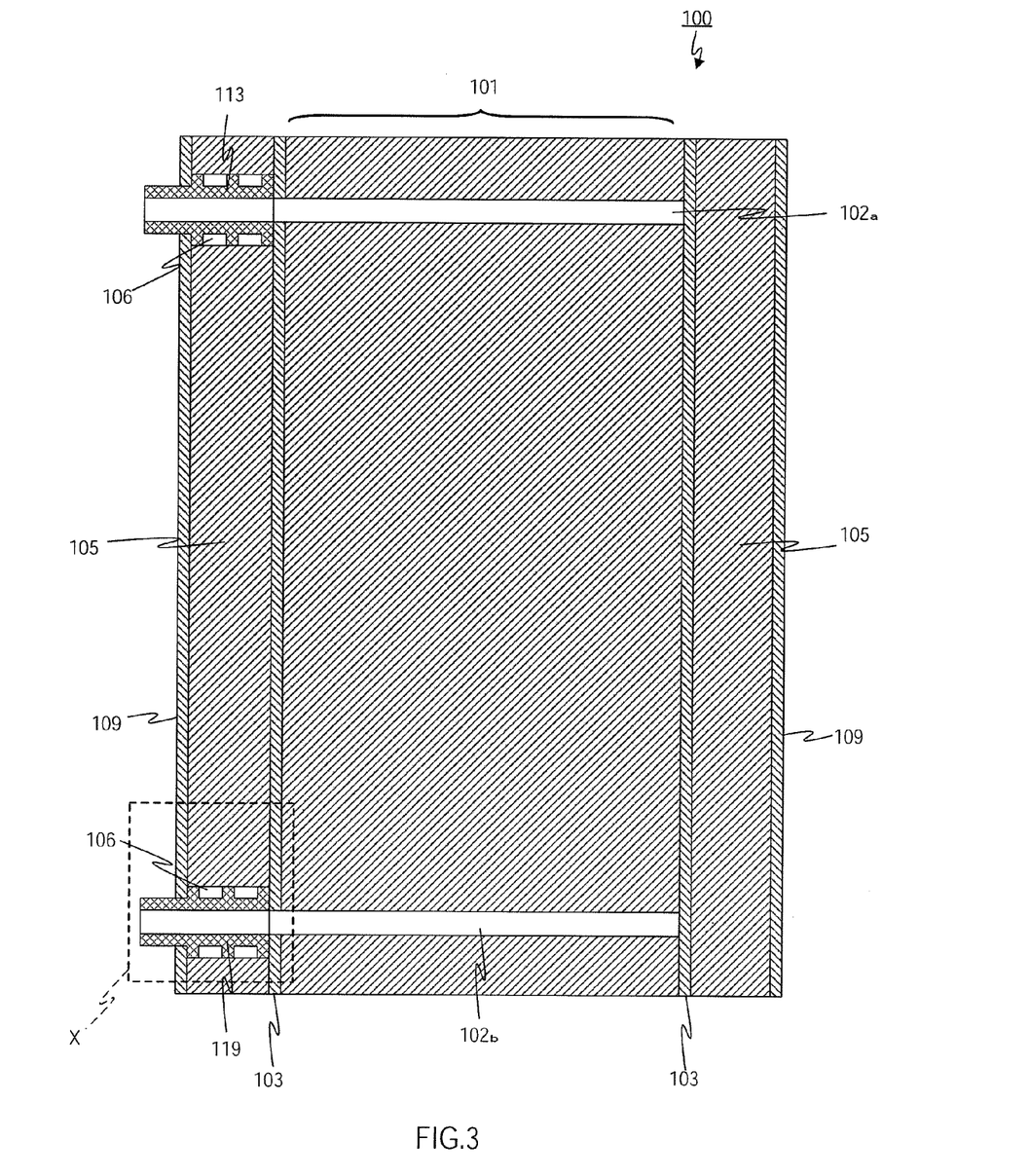
FIG. 3 is a sectional view of the fuel cell stack according to the embodiment 1.

The fuel cell stack according to the present invention is characterized in that the end plate has a through-hole along the stacking direction of the cell stack body (see FIG. 3). A later-described fluid tube body is inserted into the through-hole. The end plate may have a plurality of such through-holes (see FIG. 3).

The material of the end plate is preferably a resin having low thermal conductivity. When the end plate is made of a material having low thermal conductivity, the quantity of heat transferring from the fluid tube body to the end plate can be reduced, so that the quantity of heat discharged to the outside can be reduced, as described later. Examples of the material include a thermoplastic resin such as polyphenylene sulfide, and thermosetting resin such as phenolic resin.

In the fuel cell stack thus configured, a load is preferably applied to the cell stack body. The means for applying load to the cell stack body is not particularly limited. For example, a load may be applied to the cell stack body such that a load is applied to a stacked member including the cell stack body, the current-collecting plate, and the end plates (hereinafter simply referred to as "stacked member"), and the stacked member to which the load is applied is wound and held by an annular band having rigidity. A load may also be applied to the cell stack body in such a manner that a load is applied to the stacked member, and the stacked member to which the load is applied is fixed by a stud and a nut. Since the load is applied to the cell stack body, the contact resistance in the cell and between the cells is reduced so as to enhance the output of the fuel cell stack.

3. Fluid Tube Body

The fluid tube body is a tube body that is connected to the manifold of the cell stack body for supplying or discharging the fluid to or from the manifold. The fluid tube body is detachably inserted into the through-hole of the end plate, and passes through the end plate, as described above (see FIG. 4B). Since the fluid tube body passes through the end plate as described above, the fluid in the fluid tube body is not in direct contact with the end plate. The "fluid" means here the fuel gas, the oxide gas, or the cooling medium.

Specifically, the fluid tube body can be a fuel gas supplying tube for supplying the fuel gas to the fuel gas supplying manifold; a fuel gas discharging tube for discharging the fuel gas from the fuel gas discharging manifold; an oxide gas supplying tube for supplying the oxide gas to the oxide gas supplying manifold; an oxide gas discharging tube for discharging the oxide gas from the oxide gas discharging manifold; a cooling medium supplying tube for supplying the cooling medium to the cooling medium supplying manifold; or a cooling medium discharging tube for discharging the cooling medium from the cooling medium discharging manifold.

In the present invention, a part of the surface (hereinafter simply referred to as "through-hole opposite surface"), which is opposite to the inner surface of the through-hole, of the outer surfaces of the fluid tube body, is separated from the inner surface of the through-hole. Therefore, in the present invention, a gap is formed between the through-hole opposite surface of the fluid tube body and the inner surface of the through-hole of the end plate.

In order to separate a part of the through-hole opposite surface of the fluid tube body from the inner surface of the through-hole of the end plate, a concave/convex shape may be formed on the through-hole opposite surface of the fluid tube body or on the inner surface of the through-hole of the end plate.

When the concave/convex shape is formed on the through-hole opposite surface of the fluid tube body, the top surface of the convex portion on the through-hole opposite surface of the fluid tube body is in contact with the inner surface of the through-hole. On the other hand, the concave portion on the through-hole opposite surface of the fluid tube body is separated from the inner surface of the through-hole to form a gap between the through-hole opposite surface of the fluid tube body and the inner surface of the through-hole (see an embodiment 1).

When the concave/convex shape is formed on the through-hole opposite surface of the fluid tube body, the number of the convex portion on the through-hole opposite surface of the fluid tube body may be one, but plural convex portions are preferably formed. When the through-hole opposite surface of the fluid tube body has plural convex portions that are in contact with the inner surface of the through-hole, the fluid tube body inserted into the through-hole of the end plate can be prevented from being shaken.

The convex portion on the through-hole opposite surface of the fluid tube body includes a rib formed on the through-hole opposite surface of the fluid tube body. The rib formed on the through-hole opposite surface of the fluid tube body extends preferably along the direction of the flow of the fluid passing through the fluid tube body (see FIG. 5). Since the rib extends along the direction of the fluid flow, the strength of the fluid tube body can be secured.

When the concave/convex shape is formed on the inner surface of the through-hole of the end plate, the shape of the concave portion and the shape of the convex portion on the inner surface of the through-hole are not particularly limited, so long as a part of the through-hole opposite surface of the fluid tube body is separated from the inner surface of the through-hole so as to form a gap between the through-hole opposite surface of the fluid tube body and the inner surface of the through-hole (see an embodiment 2).

When the concave/convex shape is formed on the inner surface of the through-hole of the end plate, the number of the convex portion on the inner surface of the through-hole may be one, but plural convex portions are preferably formed. When the inner surface of the through-hole has plural convex portions that are in contact with the through-hole opposite surface of the fluid tube body, the fluid tube body inserted into the through-hole of the end plate can be prevented from being shaken.

The material of the fluid tube body is preferably a resin having low thermal conductivity. When the fluid tube body is made of a material having low thermal conductivity, the quantity of heat transferring from the fluid tube body to the end plate can be reduced, so that the quantity of heat discharged to the outside can be reduced. Examples of the material include a thermoplastic resin such as polyphenylene sulfide, and thermosetting resin such as phenolic resin.

As described above, the fluid tube body extends through the end plate in the present invention, whereby the fluid flowing through the fluid tube body is not in direct contact with the end plate. Accordingly, the heat of the fluid flowing through the fluid tube body is difficult to transfer to the end plate.

In the present invention, the through-hole opposite surface of the fluid tube body and the inner surface of the through-hole are partially separated from each other, so that the gap is formed between the through-hole opposite surface of the fluid tube body and the inner surface of the through-hole of the end plate. Accordingly, air in the gap functions as a heat-insulating member. Therefore, when the fluid tube body is a tube body for discharging a fluid (the fuel gas discharging tube, the oxide gas discharging tube, or the cooling medium discharging tube), the thermal energy accumulated on the fluid flowing through the fluid tube body is difficult to transfer to the end plate, whereby the thermal energy discharged to the outside through the end plate is small. Therefore, the thermal energy accumulated on the fluid can efficiently be collected. Since the cooling medium in the cooling medium discharging tube accumulates the most thermal energy, the fluid tube body is preferably the cooling medium discharging tube connected to the cooling medium discharging manifold.

On the other hand, when the fluid tube body is a tube body for supplying a fluid (the fuel gas supplying tube, the oxide gas supplying tube, or the cooling medium supplying tube), the quantity of the thermal energy transferring to the fluid tube body from the end plate is small, since the gap is formed between the through-hole opposite surface of the fluid tube body and the inner surface of the through-hole of the end plate. Therefore, the fluid can be supplied to the manifold through the fluid tube body without being affected by the heat.

The embodiment of the fuel cell stack according to the present invention will be described below with reference to the drawings.

Embodiment 1

Figure 2:
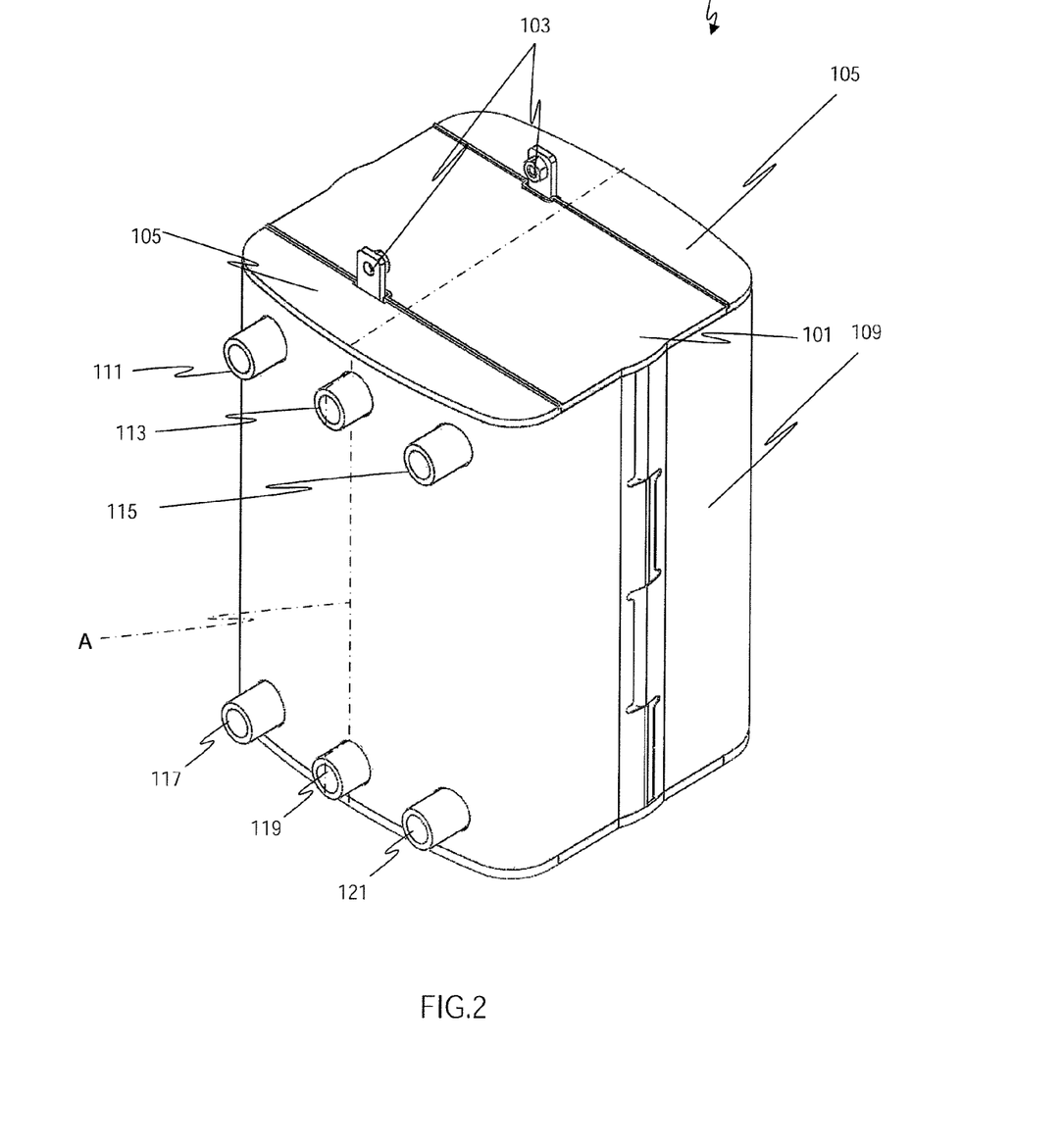
FIG. 2 is a perspective view of a fuel cell stack according to an embodiment 1.

FIG. 2 is a perspective view of fuel cell stack 100 according to an embodiment 1. As illustrated in FIG. 2, fuel cell stack 100 includes cell stack body 101, current-collecting plate 103, end plates 105, and annular band 109. The annular band 109 winds a stacked member composed of cell stack body 101, current-collecting plate 103, and end plates 105, for holding the same. Fuel cell stack 100 further includes oxide gas supplying tube 111, cooling medium supplying tube 113, fuel gas supplying tube 115, fuel gas discharging tube 117, cooling medium discharging tube 119, and oxide gas discharging tube 121.

FIG. 3 is a sectional view taken along a one-dot-chain line A of fuel cell stack 100 illustrated in FIG. 2. As illustrated in FIG. 3, cell stack body 101 is sandwiched between a pair of current-collecting plates 103, and cell stack body 101 and current-collecting plates 103 are sandwiched between a pair of end plates 105.

As illustrated in FIG. 3, end plate 105 has through-hole 106 along the stacking direction of cell stack body 101. A cooling medium supplying tube 113 is connected to cooling medium supplying manifold 102a of cell stack body 101, while cooling medium discharging tube 119 is connected to cooling medium discharging manifold 102b of cell stack body 101. Cooling medium supplying tube 113 and cooling medium discharging tube 119 are detachably inserted into through-hole 106, and extends through end plate 105.

Figure 4A:
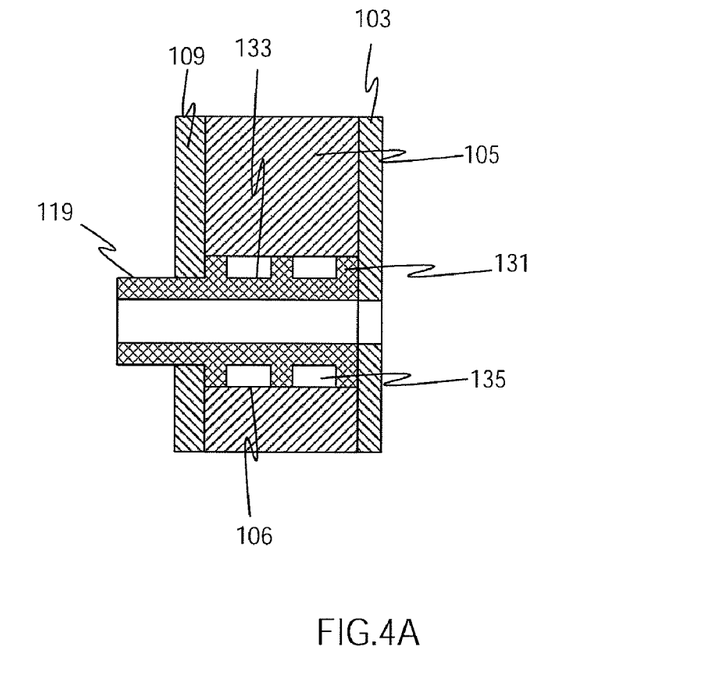
FIG. 4 is an enlarged sectional view of the fuel cell stack according to the embodiment 1.

FIG. 4A is an enlarged view of a rectangle X in FIG. 3. As illustrated in FIG. 4A, the surface, opposite to inner surface of through-hole 106, of the outer surface of cooling medium discharging tube 119, has convex portion 131 and concave portion 133. Top surface of convex portion 131 is in contact with the inner surface of through-hole 106. On the other hand, concave portion 133 is separated from the inner surface of through-hole 106. Therefore, gap 135 is formed between end plate 105 and cooling medium discharging tube 119.

Since gap 135 is formed between the through-hole opposite surface of the cooling medium discharging tube 119 and the inner surface of through-hole 106 of end plate 105, the air in gap 135 functions as a heat-insulating member, whereby the quantity of heat transferring to end plate 105 from the cooling medium that stores the thermal energy, which flows through cooling medium discharging tube 119, is reduced.

Figure 4B:
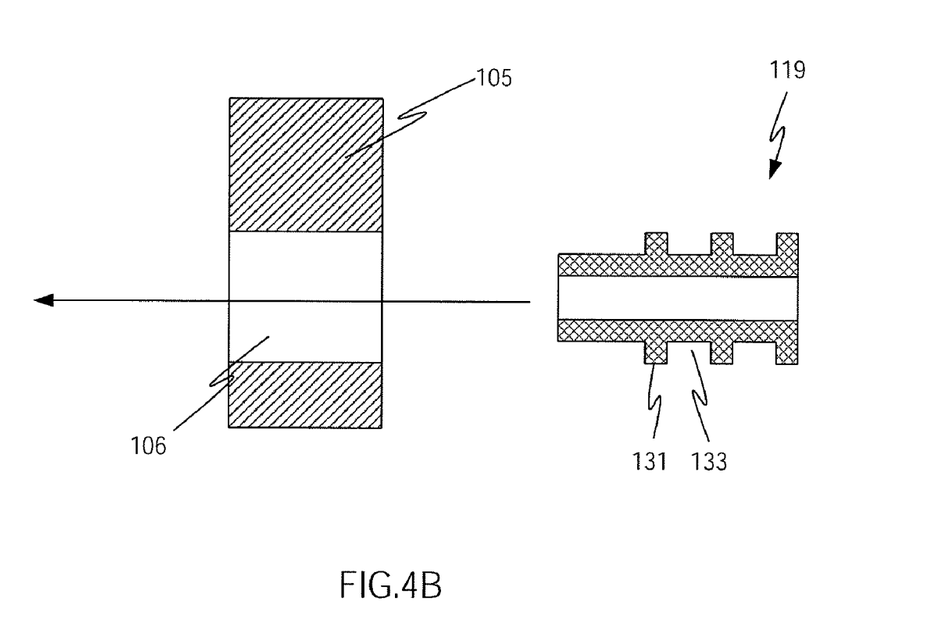

FIG. 4B illustrates the state in which cooling medium discharging tube 119 is mounted to end plate 105. As illustrated in FIG. 4, cooling medium discharging tube 119 is detachably mounted to through-hole 106 of end plate 105, thereby being mounted to end plate 105.

Figure 5:
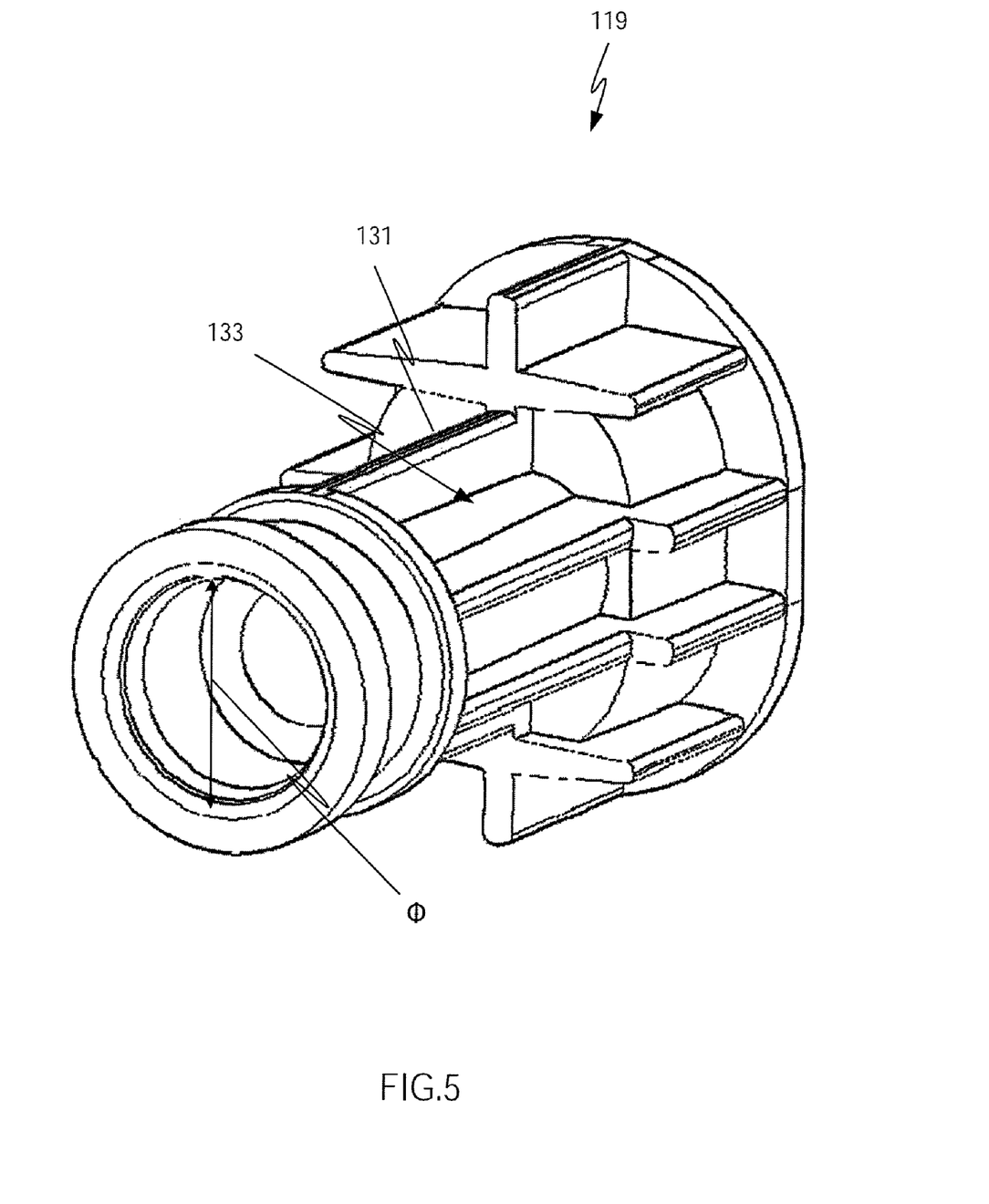
FIG. 5 is a perspective view of a cooling medium discharging tube in the fuel cell stack according to the embodiment 1.

FIG. 5 is a perspective view of cooling medium discharging tube 119. As illustrated in FIG. 5, convex portion 131 on the outer surface of cooling medium discharging tube 119 is a rib. Rib 131 extends along the direction of flow of the cooling medium passing through cooling medium discharging tube 119. Since rib 131 extends along the direction of the flow of the cooling medium, the strength of cooling medium discharging tube 119 can be secured with reduced material. The diameter $\Phi$ of cooling medium discharging tube 119 is 5 to 15 mm, and specifically, about 8 mm.

According to the present embodiment, the quantity of the thermal energy, which is accumulated on the cooling medium and transferring to the end plate, is small, so that the quantity of heat discharged to the outside through the end plate can be reduced. Therefore, the heat generated during the power generation can efficiently be collected.

The present embodiment has been described mainly with the cooling medium discharging tube. However, the fuel gas supplying tube, the fuel gas discharging tube, the oxide gas supplying tube, the oxide gas discharging tube, and the cooling medium supplying tube may have the same configuration.

Embodiment 2

The fuel cell stack in which the through-hole opposite surface of the fluid tube body has the concave/convex shape has been described in the embodiment 1. The embodiment 2 describes the case in which the inner surface of the through-hole of the end plate has the concave/convex shape.

Figure 6:
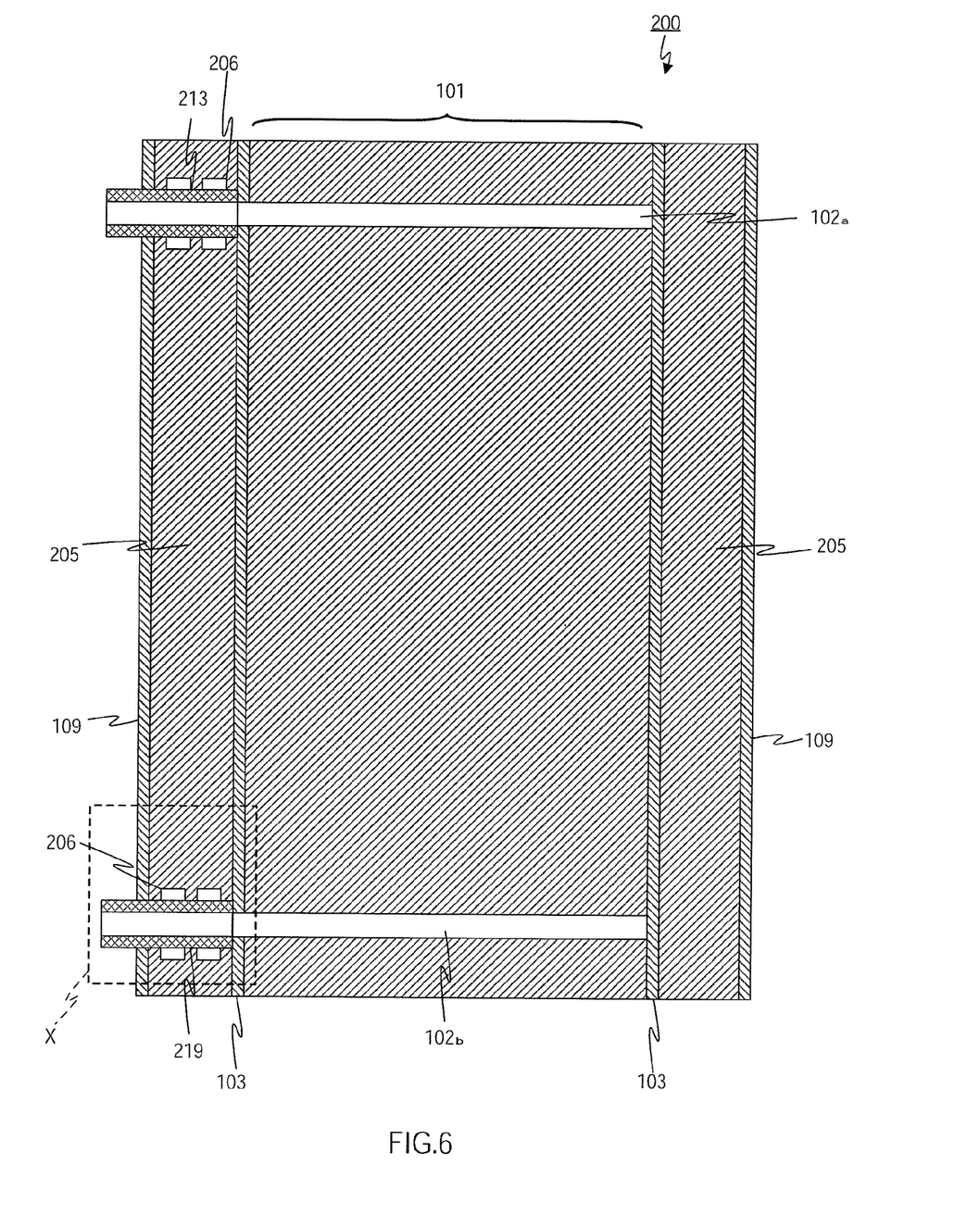
FIG. 6 is a sectional view of a fuel cell stack according to an embodiment 2.

FIG. 6 is a sectional view of fuel cell stack 200 according to the embodiment 2. Fuel cell stack 200 is the same as fuel cell stack 100 in the embodiment 1, except that the shapes of the cooling medium supplying tube, the cooling medium discharging tube, and the through-hole of the end plate are different. The components same as those in the embodiment 1 are identified by the same numerals, and the description thereof will not be repeated.

As illustrated in FIG. 6, an end plate 205 of fuel cell stack 200 has through-hole 206 along the stacking direction of cell stack body 101. A cooling medium supplying tube 213 and cooling medium discharging tube 219 are respectively inserted into through-hole 206 so as to pass through end plate 205.

Figure 7A:
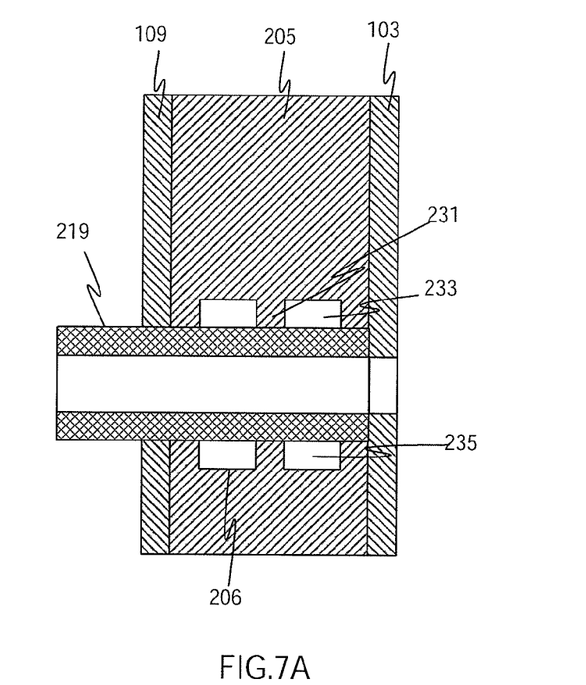
FIG. 7 is an enlarged sectional view of the fuel cell stack according to the embodiment 2.

FIG. 7A is an enlarged view of a rectangle X in FIG. 6. As illustrated in FIG. 7A, the inner surface of through-hole 206 has convex portion 231 and concave portion 233. The top surface of convex portion 231 is in contact with cooling medium discharging tube 219. On the other hand, concave portion 233 is not in contact with cooling medium discharging tube 219. Therefore, gap 235 is formed between end plate 205 and cooling medium discharging tube 219.

Figure 7B:
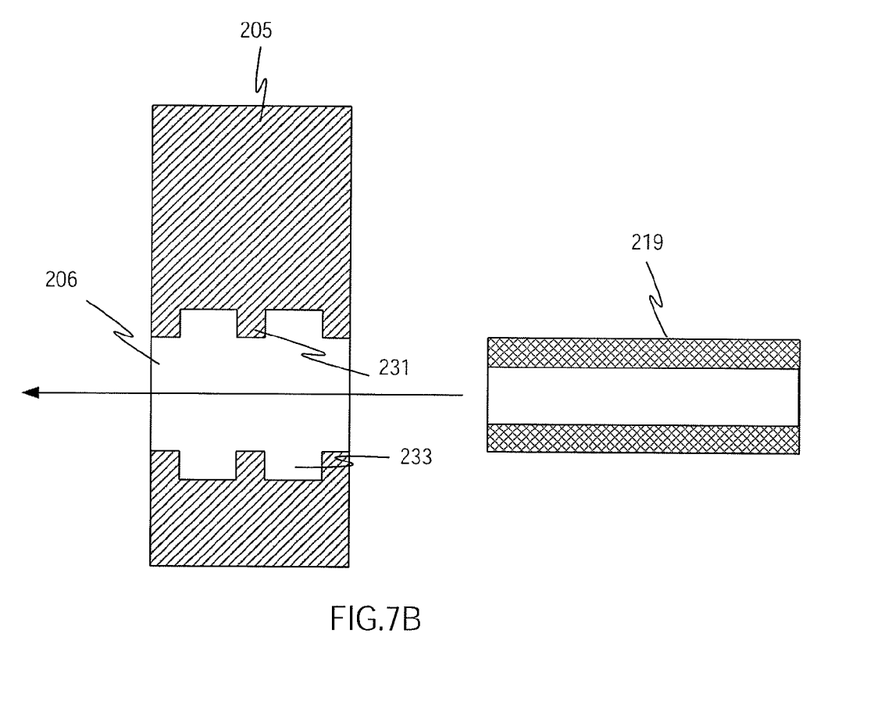

FIG. 7B illustrates the state in which cooling medium discharging tube 219 is mounted to end plate 205. As illustrated in FIG. 7B, cooling medium discharging tube 219 is detachably inserted into through-hole 206 of end plate 205, so as to be mounted to end plate 205.

The present embodiment has been described mainly with the cooling medium discharging tube. However, the fuel gas supplying tube, the fuel gas discharging tube, the oxide gas supplying tube, the oxide gas discharging tube, and the cooling medium supplying tube may have the same configuration.

The present application claims priority from Japanese Patent Application No. JP2009-080362 filed on Mar. 27, 2009, the entire content of which is incorporated herein by reference.

INDUSTRIAL APPLICABILITY

In the fuel cell stack according to the present invention, the quantity of heat discharged to the outside is small, whereby it is useful for a fuel cell stack utilized for a home cogeneration system.

DESCRIPTION OF REFERENCE NUMERALS

100, 200: fuel cell stack
101: cell stack body
102: area
103: current-collecting plate
105, 205: end plates
106, 206: through-hole of end plates
109: annular band
111: oxide gas supplying tube
113, 213: cooling medium supplying tube
115: fuel gas supplying tube
117: fuel gas discharging tube
119, 219: cooling medium discharging tube
121: oxide gas discharging tube
131: convex portion which is located on the surface opposite to inner surface of through-hole
133: concave portion which is located on the surface opposite to inner surface of through-hole
135, 235: gap
231: convex portion which is located on the inner surface of through-hole
233: concave portion which is located on the inner surface of through-hole

The invention claimed is:

1. A fuel cell stack comprising:
a cell stack body having stacked single cells and a manifold for supplying or discharging a fluid to or from the stacked single cells, each single cell including a membrane electrode assembly and a separator sandwiching the membrane electrode assembly;
an end plate stacked onto the cell stack body and having a through-hole extending along the stacking direction of the cell stack body; and
a fluid tube body detachably inserted into the through-hole so as to pass through the end plate, the fluid tube body being connected to the manifold, wherein
a part of the outer surface of the fluid tube body opposite to the inner surface of the through-hole is separated from the inner surface of the through-hole, and
the outer surface of the fluid tube body has a concave/convex shape, a top surface of a convex shape portion of the outer surface of the fluid tube body being in contact with the inner surface of the through-hole, or
the inner surface of the through-hole has a concave/convex shape, a top surface of a convex shape portion of the inner surface of the through-hole being in contact with the outer surface of the fluid tube body.

2. A fuel cell stack according to claim 1, wherein
the convex shape portion includes a rib,
the rib extends along the direction of a flow of the fluid passing through the fluid tube body.

3. A fuel cell stack according to claim 1, wherein
the fluid tube body is connected to the manifold for discharging a cooling medium.

\* \* \* \* \*